(12) United States Patent
Zdornov et al.

(10) Patent No.: US 11,829,632 B2
(45) Date of Patent: Nov. 28, 2023

(54) METRICS AGGREGATION

(71) Applicant: VAST DATA LTD., Tel Aviv (IL)

(72) Inventors: Vlad Zdornov, Tel Aviv (IL); Eli Dorfman, Tel Aviv (IL); Gili Berg, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 49 days.

(21) Appl. No.: 17/454,247

(22) Filed: Nov. 9, 2021

(65) Prior Publication Data
US 2023/0145992 A1 May 11, 2023

(51) Int. Cl.
*G06F 3/06* (2006.01)
(52) U.S. Cl.
CPC .......... *G06F 3/0653* (2013.01); *G06F 3/0604* (2013.01); *G06F 3/067* (2013.01); *G06F 3/0614* (2013.01); *G06F 3/0659* (2013.01)
(58) Field of Classification Search
CPC .... G06F 3/0653; G06F 3/0604; G06F 3/0614; G06F 3/0659; G06F 3/067
See application file for complete search history.

(56) References Cited

U.S. PATENT DOCUMENTS

| | | | | |
|---|---|---|---|---|
| 10,810,054 | B1* | 10/2020 | Martinez Lerin | ....... G06F 3/067 |
| 11,093,496 | B1* | 8/2021 | Bhatia | ............... G06F 16/24552 |
| 2019/0007280 | A1* | 1/2019 | Sarangam | ............. H04L 47/822 |
| 2022/0166828 | A1* | 5/2022 | Govande | ............ H04L 67/1097 |

* cited by examiner

*Primary Examiner* — Michelle T Bechtold
(74) *Attorney, Agent, or Firm* — Reches Patents

(57) ABSTRACT

A method for monitoring a storage system, the method may include (a) generating a compute entity (CE) storage metric by each CE of a group of CEs to provide multiple CE storage metrics, wherein the multiple CE metrics are related to a monitoring period; and (b) calculating, during a calculation period, a group metric based on the multiple CE storage metrices; wherein the calculating includes performing multiple calculations iterations, wherein each calculation iteration includes (a) selecting an updating CE that belongs to the group of CEs and was not previously selected during the calculation period, (b) accessing, by the updating CE, a shared data structure that stores the group storage metric, and (c) updating the group storage metric using the CE storage metric of the updating CE.

21 Claims, 5 Drawing Sheets

METRICS AGGREGATION

TECHNICAL FIELD

The present disclosure generally relates to the field of data storage, and more particularly to metrics aggregation.

BACKGROUND

Storage systems generate metrics information that is required for diagnostics and monitoring services provided to system administrators and technical support, so as to improve the management of computing and storage resources, managing Service Level Agreements, detecting malfunctions or potential malfunctions, analyzing system behavior, etc.

Various measurements need to be collected from various modules of the storage system and aggregated into metrics. Measurement collection can be done by a central management entity that monitors the various modules for obtaining module measurements that are summed into a global metric.

Alternatively, the various modules can add their own measurements into a shared counter that sums all the measurements related to a specific metric. Updating the shared counter requires using mutual exclusion mechanism for accessing the shared counter, such as locks or semaphores.

Both solutions are problematic when multitude modules are involved, and also when a large number of metrics is to be provided. Collecting measurements by a central entity can be lengthy and consume substantial compute resources of the central entity. Synchronizing multitude modules by using mutual exclusion mechanism for updating even one shared counter is complicated and wastes time of the modules due to lock wait times, particularly when multitude metrics needs to be collected.

There is a need to provide metrics aggregation in a large-scale storage system

SUMMARY

There may be provide a storage system, a method and a non-transitory computer readable medium for metrics aggregation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
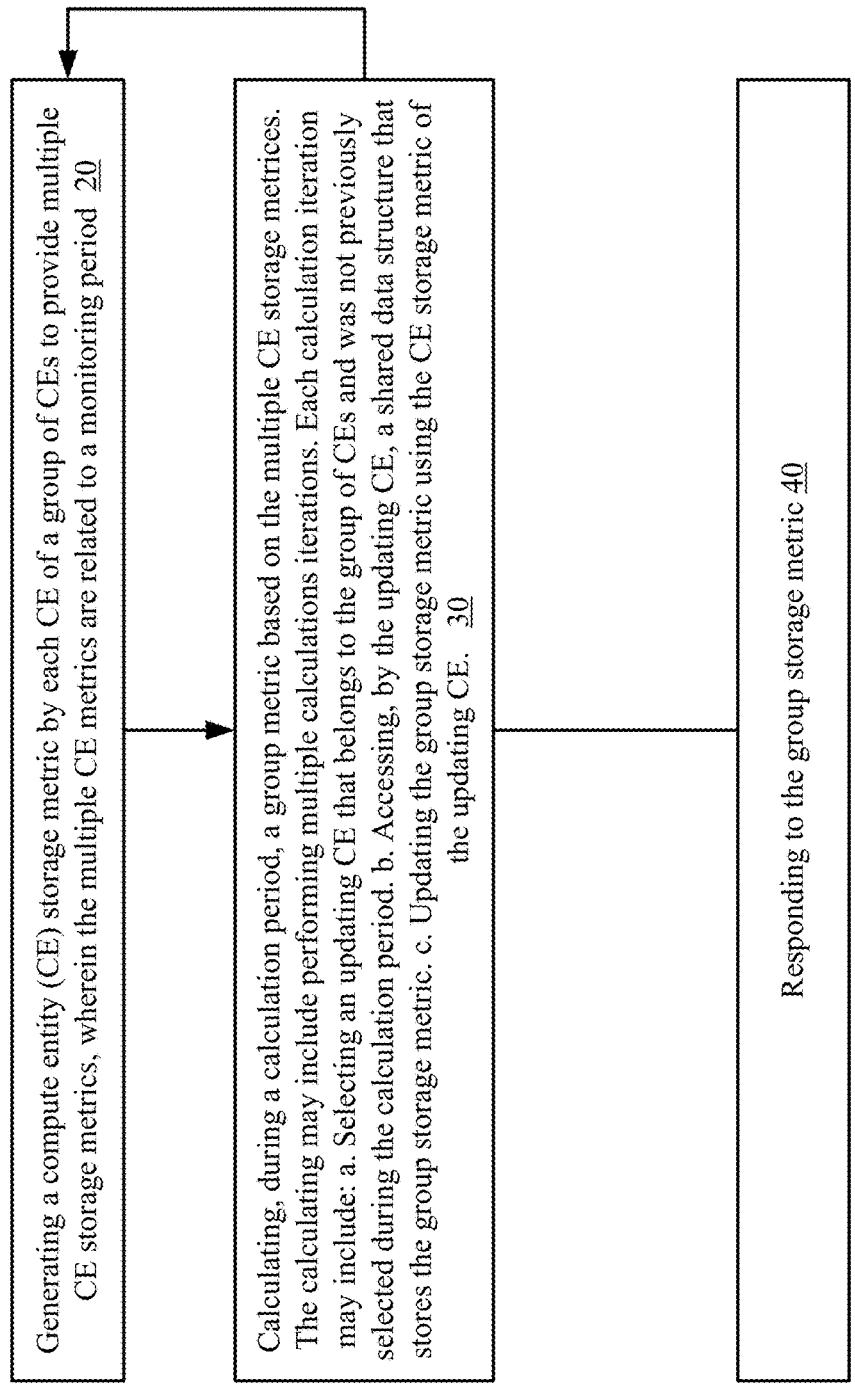
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core . The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods and non-transitory computer readable medium for metrics aggregation.

A storage system may be configured to aggregate multitude metrics of various types: performance metrics, resource metrics, event metrics, debug metrics, and so on. The performance metrics may include, for example, IO per second (TOPS), throughput per second, latency (read/write latency) or more detailed metrics, such as: read or write request per second, inbound throughput, outbound throughput, sequential write requests, random read requests, write requests of certain ranges, etc. Event metrics may be grouped according to various grouping categories, e.g., severity, affected storage device, etc. Each metric may include one or more counters.

The storage system includes a large number (for example—more than 500, 1000, 5000, 10000, 50000, 100000 and even more) of compute entities. Different modules and functions of the storage system are sharded across the compute entities, where each compute entity carries out a portion of the functionality. Therefore, each metric provided by the system is an aggregation of measurements from multitude compute entities.

According to embodiments of the invention, metrics are aggregated and stored in a shared metric store that is accessible to all the compute entities and stores gauges for the various metrics to be collected. The metrics are updated during aggregation cycles.

Upon the beginning of each aggregation cycle, one of the compute entities is selected as the manager, for performing operations related to the cycle initiation, monitoring the progress of the cycle, and performing operations related to the cycle termination. Upon the beginning of each cycle, a different compute entity is selected as the manager, so as to balance the workload imposed by the cycle management. The cycle initiation includes operations such as resetting shared gauges and initiating a tracking table for tracking the progress of the cycle, as explained hereinafter.

The manager assigns the first compute entity as the updating compute entity, which means that the first compute entity has now the exclusive right to updating metrics. When the first compute entity finishes updating the relevant metrics, it assigns the next compute entity as the updating compute entity. The cycle continues until the last compute entity updates the metrics.

The manager is further responsible to initiate (e.g., reset) the tracking table for tracking which compute entities have completed their updating during the current cycle. Each compute entity that has finished its updating adds its identifier to the tracking table. The manager is further responsible for monitoring the tracking table to detect when all the compute entities have finished the updating. The manager may detect problems in handing over the updating right from one compute node to the next compute node, for example, when a compute node fails, and may hand over the updating right to the compute entity that follows the failed compute node.

When the manager detects that all the compute entities has finished their update, it enables updating historic collected metrics (aggregated in previous cycles) with the contribution of the metrics collected during the current cycle.

Each metric may be associated with: a metric identifier, the system parameter that is being measured, e.g., incoming throughput, and the statistical parameters to be collected. Each metric may be associated with one or more statistical parameters to be collected, selected from: sum, count, average, minimum, maximum, deviation.

The metrics to be collected may be pre-configured or dynamically configured in a metrics list. Upon determining the metrics to be collected (or upon system initiation), each compute entity or each module that runs under the compute entity receives the list of metrics that it needs to update.

There may be different aggregation cycles to different system metrics. Some system metrics are changed faster than others and may need faster cycles. Therefore, the storage system may manage multiple types of aggregation cycles that differ from each other by the aggregation pace: e.g., once in every second, once in every minute, once every five minutes, etc.

Each compute entity is assigned with a compute entity identifier, which may be a sequence number, and the right to updating may proceed, for example, from the lowest compute entity identifier to the highest compute entity identifier. Any other selection mechanism for selecting the next updating compute entity may be implemented.

Each updating compute entity that finishes updating its contribution to the metrics hands over the exclusive updating right to the next compute entity in line. The handing over of the exclusive updating right may be done in any type of communication between compute entities for example: via messages or via writing to a shared memory that is accessible to both compute entities. In the latter case, the identity of the next compute entity to become the updater is written to a shared memory, and each compute entity may monitor the value of the identity of the updating compute entity to determine whether it is currently the updating compute entity.

FIG. 1 illustrates an example of method 10 for monitoring a storage system.

Method 10 may include step 20 of generating a compute entity (CE) storage metric by each CE of a group of CEs to provide multiple CE storage metrics, wherein the multiple CE metrics are related to a monitoring period. The monitoring period is a period during which step 20 is executed. The monitoring period may be of any duration - seconds, minutes, and more. A duration of a monitoring period may be responsive to a CE storage metrics that is being determined, may be responsive to a request or definition obtained from outside the storage system or from within the storage system, and the like.

Step 20 may be followed by step 30 of calculating, during a calculation period, a group metric based on the multiple CE storage metrices.

The calculation period is a period during which step 30 is executed. The calculation period may be of any duration—seconds, minutes, and more. A duration of a calculation period may be responsive to the number of CEs in the group, a CE storage metrics that is being determined, may be responsive to a request or definition obtained from outside the storage system or from within the storage system, and the like The calculating may include performing multiple calculations iterations. Each calculation iteration may include:
 a. Selecting an updating CE that belongs to the group of CEs and was not previously selected during the calculation period.
 b. Accessing, by the updating CE, a shared data structure that stores the group storage metric.
 c. Updating the group storage metric using the CE storage metric of the updating CE.

Phases (a), (b) and (c) may be repeated until all members of the group of CEs update the group storage metric.

The selection of the next updating CE can be made in any manner—but it is beneficial to do so with a low (even minimal) communication footprint. This may be achieved, for example, using a predefined order of updating CE and having a current updating CE to ask the next in order of the CEs to become the next updating CE.

Steps 20 and 30 may be executed in a pipelined manner—for example—during an n'th cycle—a group of CEs may compute the CE storage metrics, while the group of CEs may also participate in the calculation of the group storage metric of the (n-1)'th cycle. Generating CE storage metrics may be performed constantly, where different monitoring periods are performed back to back, while the calculation periods may be executed periodically, in a certain frequency that is selected according to the storage metric that is being calculated. The calculations during a calculation period may be of CE storage metrics that were generated since the previous calculation period.

It should be noted that the group of CEs may include all CEs of the storage system or only some of the CEs of the storage system.

The members of a group of CEs may change over time—and/or from one CE storage metric to another. The number of members may change, the identity of members may change—and the like.

Each repetition of steps (a) and (b) (also referred to as a cycle) can be managed by one or more of the CEs of the group, or another CE of the storage system—this CE is referred as a manager CE. The manager CE may be elected per one or more cycles. The manager CEs can be replaced after each cycle, after more than a single cycle, due to a fault in the operation of the manager CE, due to any load balancing parameter, and the like.

The rules of replacement (of a manager CE) can be determined in advance. Alternatively—the replacement (identity of the new manager CE) can be done randomly or pseudo-randomly. Any selection process may be applied, and the selection of the new manager CE may be executed by any entity—the current manager CE, or any other CE.

The hand over between different updating CEs of different calculations iterations may be managed in any manner and by any entity.

The selection may be according to a predefined rule—for example according to a certain order of CEs of the group, according to any replacement rule, may be done randomly or pseudo randomly.

In order to reduce traffic between different CE or traffic between one or more CEs and another entity—information regarding a current updating CE (for example writing the identifier of each current updating CE), and/or any CE that was an updating CE during a current cycle may be stored in shared log (or any data structure) indicative of CEs that already updated the group storage metric during the calculation period. The shared log may be stored in a non-volatile memory.

The method may include monitoring, by the manager CE a progress of the one or more repetitions associated with the manager CE. For example—the manager CE may use the content of the log to see if all members of the group acted, during the cycle, as updating CEs—and if so—step 30 of the cycle ended.

Multiple cycles of steps 20 and 30 may be executed for different groups of CEs—in parallel to each other, independently from each other, while having a dependency between each other, and the like.

Cycles for different groups may be executed at the same repetition rate or at different repetition rates. A repetition rate is a number of cycles per a given time period.

Multiple cycles of steps 20 and 30 may be executed for different CE storage matrices and/or for different group storage matrices—in parallel to each other, independently from each other, while having a dependency between each other, and the like.

Cycles for different CE storage matrices and/or for different group storage matrices may be executed at the same repetition rate or at different repetition rates.

The repetition rate may be determined in advance, may depend on the characteristics of the storage metric, events and/or status of any of the CEs or any other part of the storage system, and the like. System metrics that are highly dynamic (have a high change rate or frequent events) may be collected at a higher repetition rate than system metrics that are less dynamic. For example, the repetition rate of calculating TOPS (IO Per Second) may be 1 second, while the repletion rate of summing defragmentation events may be 1 hour.

Different CE storage metrices may be monitored and calculated during a same cycle of steps 20 and 30. For example, storage metrics with similar characteristics in terms of change rate may be monitored and calculated during a same cycle. For example, throughput and IOPS may be calculated during the same cycle.

Step 30 may be followed by step 40 of responding to the group storage metric 40. This may include storing the group storage metric, archiving the group storage metric, sending an alert to an entity of the storage system (for example when the group storage metric is indicative of a fault), sending a report to a control entity of the storage system, initiating an internal analysis of one or more faulty entity of the storage entity, outputting the group storage metric outside the storage system, and the like.

Figure 2:
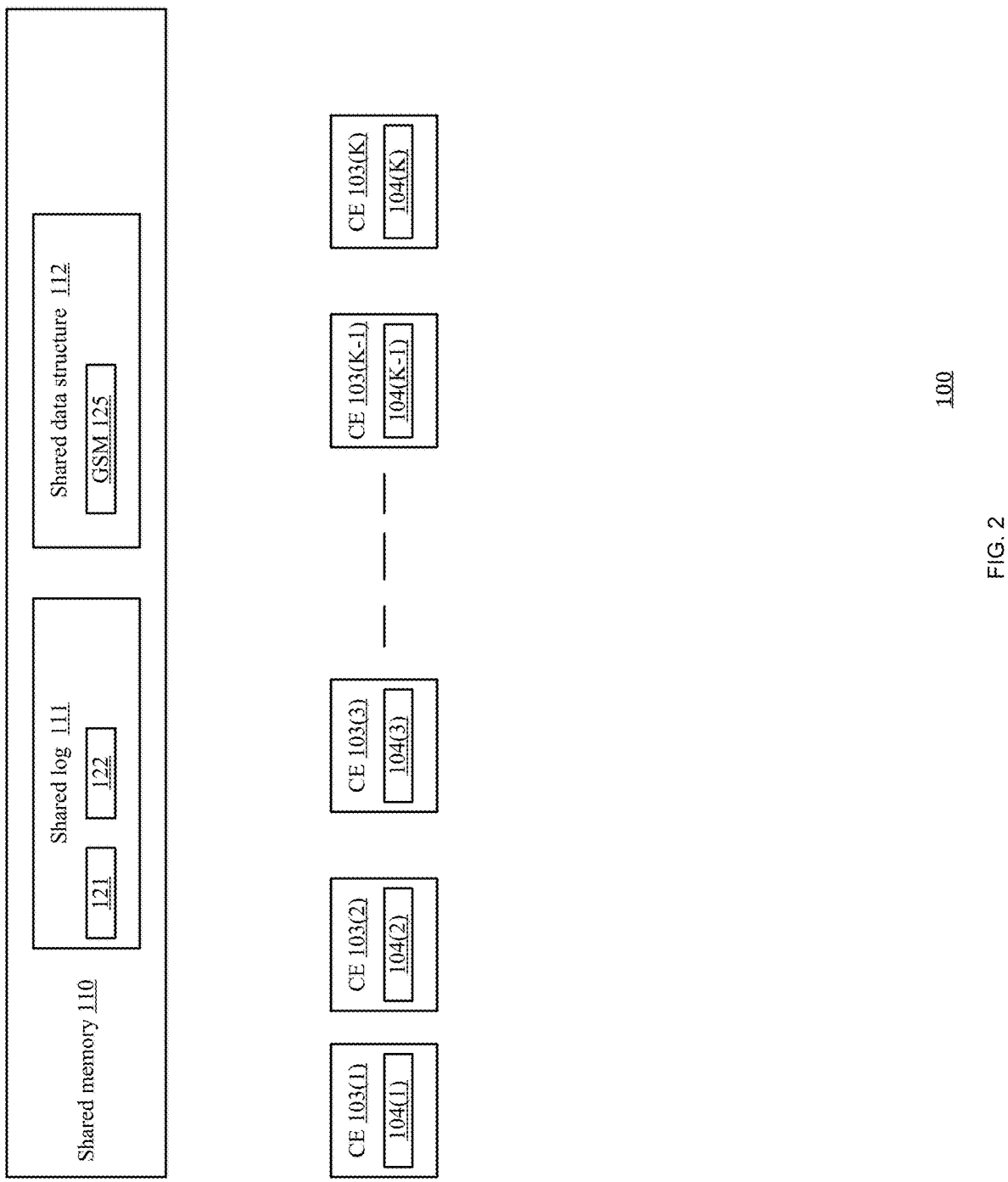
FIG. 2 is an example of compute nodes and a shared memory.

FIG. 2 illustrates an example of a group of CEs 103(1)-103(K) shown as storing (at the end of a monitoring period) CE storage metrics 104(1)-104(K), as well as a shared memory 110 that includes shared log 111 and shared data structure 112. The shared log may store the identifier (121) of a current updating CE as well as the list (122) of all updating CEs of a current cycle.

The shared data structure 112 may store the group storage metric (GSM) 125—that is updated upon each calculation iteration, by the updating CE of the iteration, and is fully updated at the end of the calculation period.

Figure 3:
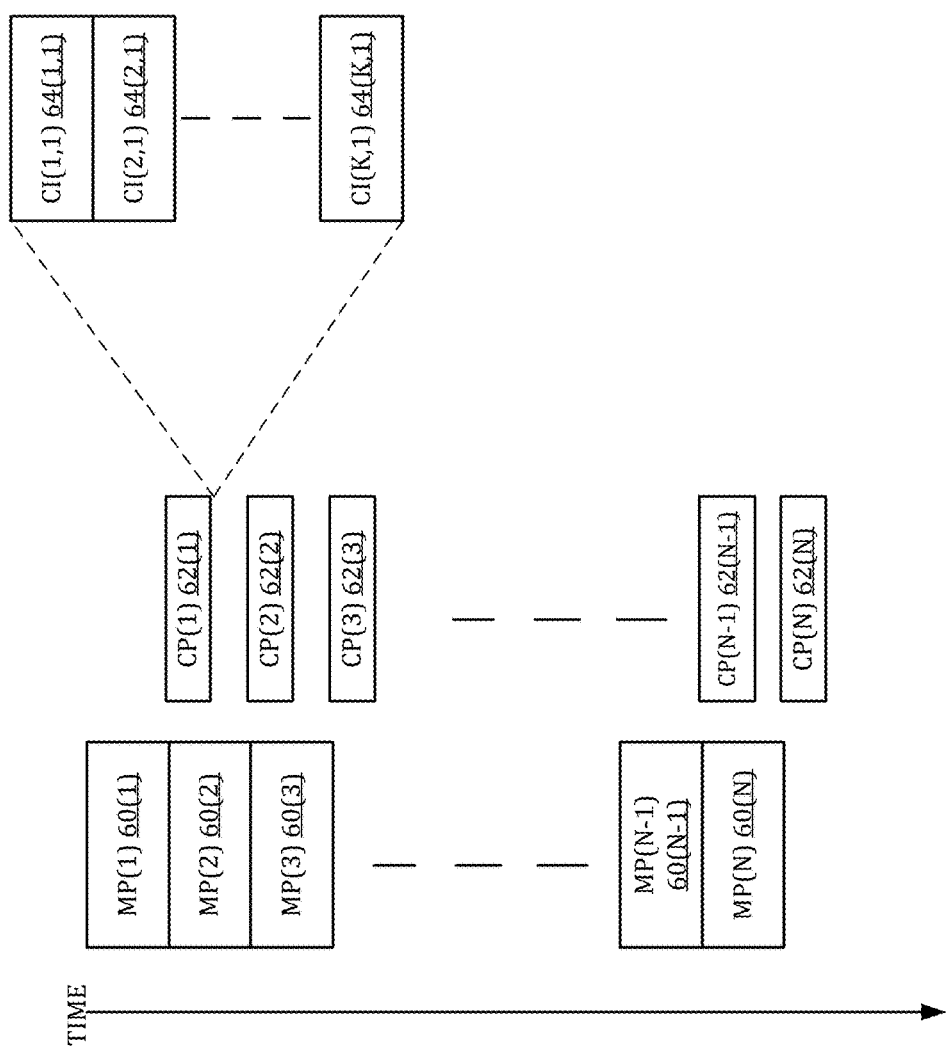
FIG. 3 is a timing diagram.

FIG. 3 is a timing diagram illustrating N cycles of steps 20 and 30. There are N monitoring periods MP(1)-MP(N) 60(1)-60(N), and N calculating periods CP(1)-CP(N) 62(1)-62(N)—that are shown as being executed in a pipelined manner. Each calculation period may include K calculation iterations—such as calculation iterations CI(1,1)- CI(K,1) 64(1,1)-64(K,1) of CP1(1) 64(1). FIG. 3 illustrates the monitoring periods as being executed back-to-back, or constantly, while the calculation periods may be shorter, and ends when all the calculation iterations are completed, i.e., when all the CEs of the groups have updated the group storage metric. Each calculation period may use the CE storage metrics that were gathered during the monitoring period that ended when the calculation period starts.

Figure 4:
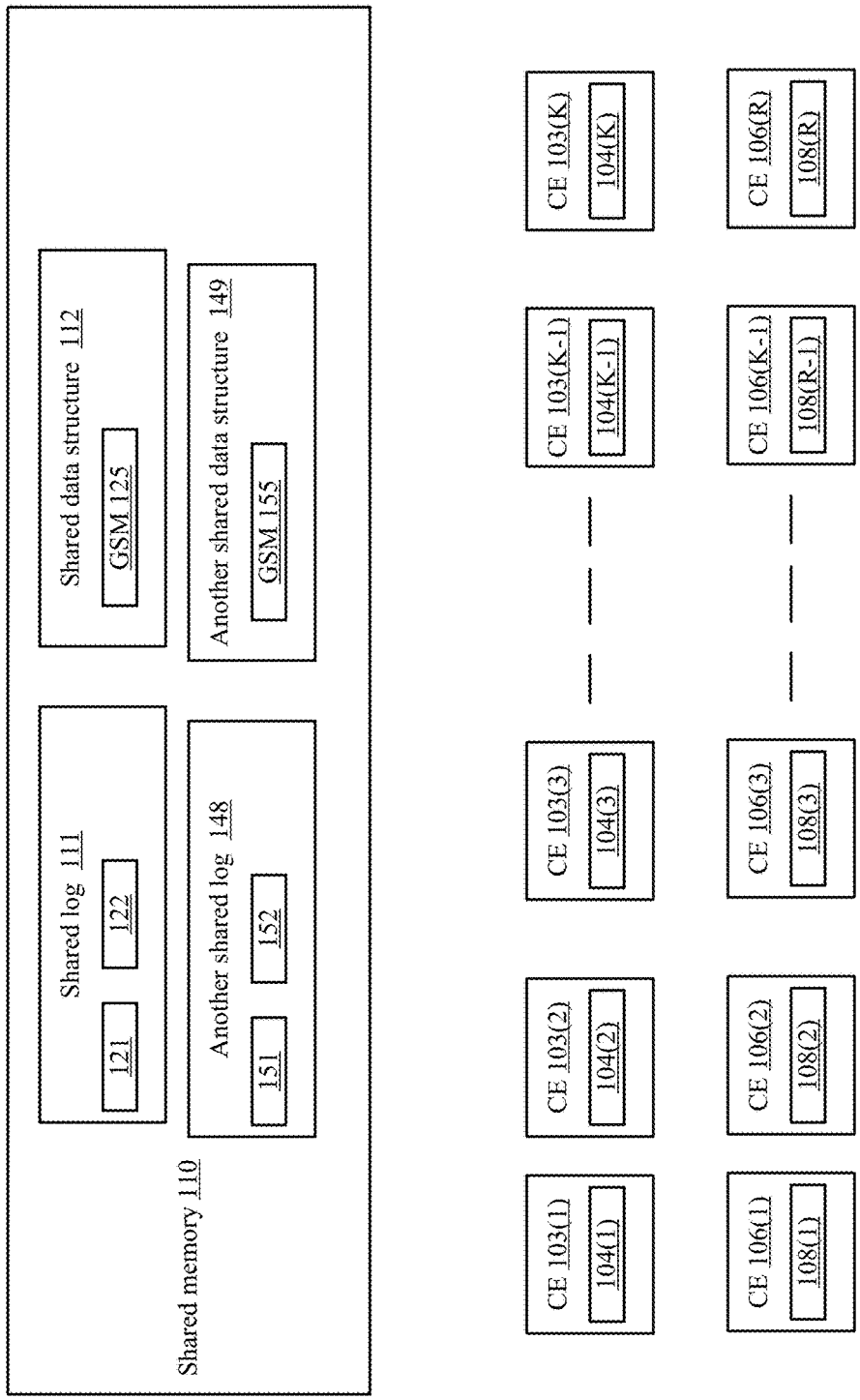
FIG. 4 is an example of compute nodes and a shared memory.

FIG. 4 illustrates:
a. A group of CEs 103(1)-103(K) shown as storing (at the end of a monitoring period) CE storage metrics 104(1)-104(K).
b. Another group of CEs 106(1)-106(R) shown as storing (at the end of a monitoring period) another CE storage metrics 108(1)-108(R).
c. Shared memory 110 that includes shared log 111, shared data structure 112, another shared log 148 and another shared data structure 149.

The shared log 111 may store the identifier (121) of a current updating CE as well as the list (122) of all updating CEs of a current cycle.

The other shared log 148 may store the identifier (151) of a current other updating CE as well as another list (152) of all other updating CEs of a current cycle.

The shared data structure 112 may store the group storage metric (GSM) 125—that is updated upon each calculation iteration. GSM equals a function applied on CE storage metrices 104(1)-104(K).

The other shared data structure 149 may store another group storage metric (AGSM) 155—that is updated upon each calculation iteration. AGSM equals a function applied on CE storage metrices 108(1)-108(R).

R may equal to K or may differ from K.

Figure 5:
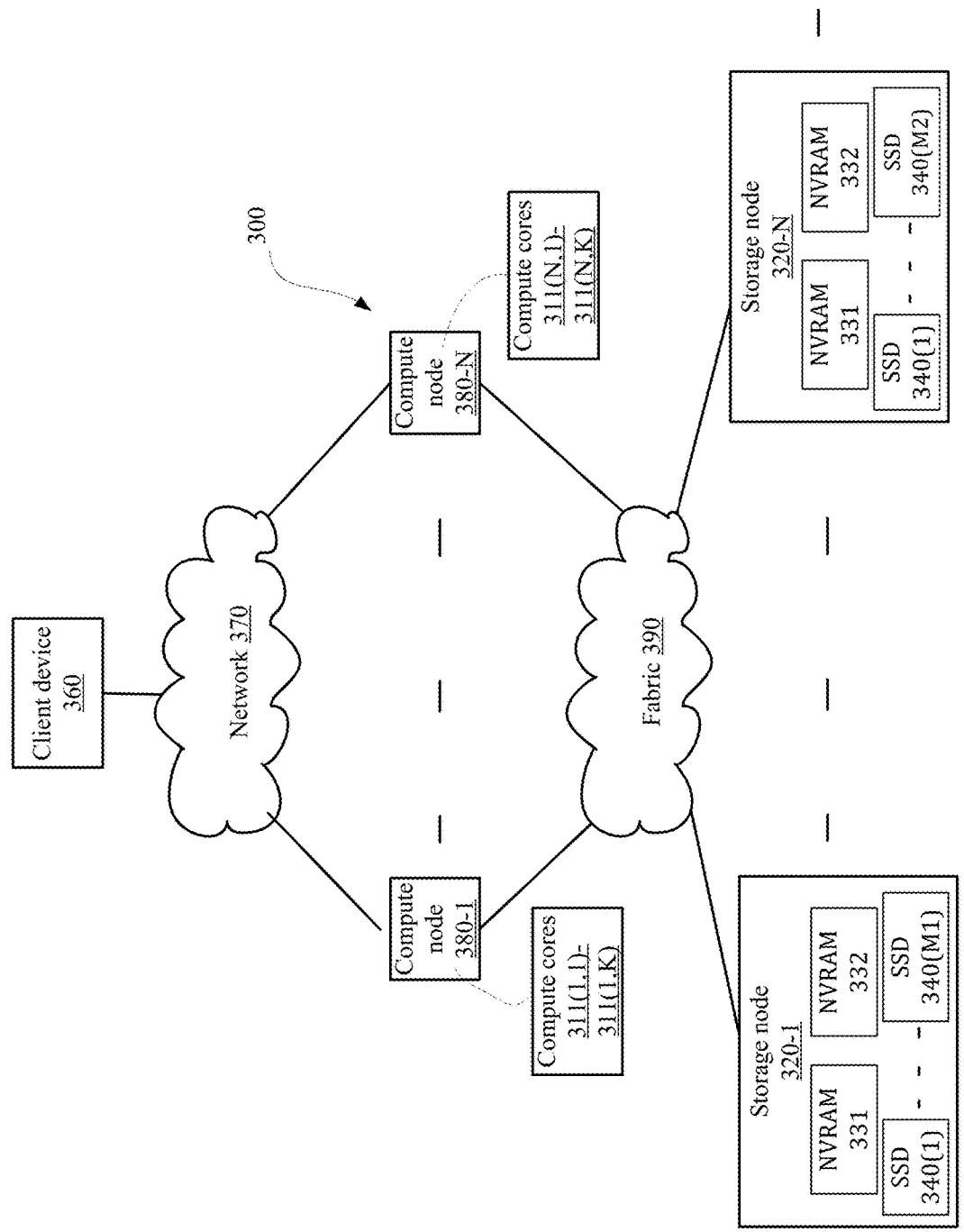
FIG. 5 is an example of a storage system.

FIG. 5 shows an example diagram of a storage system 300 according to the disclosed embodiments.

The storage system 300 includes a number of N compute nodes 380-1 through 380-N (hereinafter referred to individually as a compute node 380 and collectively as compute nodes 380, merely for simplicity purposes, N is an integer equal to or greater than 1). The compute nodes include (or may execute) multiple compute cores each—see for example compute cores 311(1,1)-311(1,K) and compute cores 311(N,1)-311(N,K). The CEs may be the compute cores 311 and the group of CEs may be the compute cores 311 of a single compute node, for example, compute cores 311(1,1)-311(1,K) form one group of CEs, and compute cores 311(N,1)-311(N,K) form another group of CEs. Alternatively, all the compute cores 311 of all the compute nodes 380 may form the group of CEs, i.e., all the compute cores of the system. According to another embodiment, the compute nodes may be the CEs, and part or all the compute nodes may be the group of CEs.

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 380 and the storage nodes 320 are connected through a communication fabric 390. M may equal N or may differ from N.

In an embodiment, a compute node 380 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 380 does not require any dedicated hardware A compute node 380 is configured to perform tasks related to the management of the storage nodes 320. In an embodiment, each compute node 380 interfaces with multiple client devices such as a client device 360. The compute nodes interface the clients via one or more networks, such as network 370. The network 370 may be, but is not limited to, the Internet, the world-wide-web (WWW), a local area network (LAN), a wide area network (WAN), and the like.

The compute nodes or the compute cores participate in executing the steps of method 10. The shared log and the shared data structure may be stored in any of the storage node that is accessible to all the compute nodes, or otherwise may be stored in a memory or a storage device that is internal to a compute node and is accessible to all the compute cores of the compute node.

In an embodiment, to efficiently read and write data to the storage nodes 320 from the physical layer, each compute node 380 performs a number of processes including data reduction, data resiliency, and Flash memory management actions (e.g., defrag, wear leveling, and so on).

It should be noted that each compute node 380 may operate in the same manner as all other compute nodes 380. In a case of a failure, any compute node 380 can replace the failed node. Further, each compute node may control and manage one or mode storage nodes 320 regardless of the specific architecture of the storage nodes 320. Therefore, there is no coupling between specific compute nodes 380 and specific storage nodes 320. As such, compute nodes can be added to the system 300 without increasing the number of storage nodes (or their capacity), and vice versa, storage nodes can be added without increasing the number of compute nodes 380.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory for storing the traversal task queues, such as NVRAM 331 and 332 of FIG. 3. The traversal task queues may be stored in either a volatile memory or non-volatile memory within the storage node.

The storage nodes 320 may be configured to have the same capacity as each other or different capacities from each other. In an embodiment, the data stored in each storage node 320 is made redundant internally within the storage node, made redundant at a different storage node, or both.

A storage node 320 may be configured to communicate with the compute nodes 380 over the communication fabric 390. It should be noted that each compute node 380 can communicate with each storage node 320 over the communication fabric 390. There may not be a direct coupling between a compute node 380 and storage node 320.

In the embodiment, the communication fabric 390 may include an Ethernet fabric, an InfiniBand fabric, and the like. Specifically, the communication fabric 390 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 360 is part of a compute node 380. In such a deployment, the system 300 does not communicate with an external network, e.g., the network 370. It should be further noted that the communication between the compute nodes 380 and the storage nodes 320 is facilitated over the fabric 390. It should be further noted that the compute nodes 320 can communicate with each other over the fabric 390. The fabric 390 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a"or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for monitoring a storage system, the method comprises:
    (a) generating a compute entity (CE) storage metric by each CE of a group of CEs to provide multiple CE storage metrics, wherein the multiple CE storage metrics are related to a monitoring period; and
    (b) calculating, during a calculation period, a group storage metric based on the multiple CE storage metrics; wherein the calculating comprises performing multiple calculations iterations, wherein each calculation iteration comprises (i) selecting an updating CE that belongs to the group of CEs and was not previously selected during the calculation period, (ii) accessing, by the updating CE, a shared data structure that stores the group storage metric, and (iii) updating the group storage metric using the CE storage metric of the updating CE; and
    (c) repeating steps (a) and (b) for different CE storage metrics and for different group storage metrics; wherein repetitions related to a given group storage metric are executed at a repetition rate that differs from a repetition rate of repetitions related to another group storage metric.

2. The method according to claim 1 comprising performing multiple repetitions of steps (a) and (b) for obtaining the group storage metric, wherein step (b) of a certain repetition for obtaining the group storage metric is executed in parallel to an execution of step (a) of a next repetition.

3. The method according to claim 1 comprising performing multiple repetitions of step (b) for obtaining the group storage metric, and selecting a manager CE that belongs to the group of CEs for each one or more repetitions of the multiple repetitions; wherein the method comprises controlling, by the manager CE, an execution of the one or more repetitions associated with the manager CE.

4. The method according to claim 3 wherein each calculation iteration comprises updating a shared log indicative of CEs that already updated the group storage metric during the calculation period.

5. The method according to claim 4 comprising determining, by the manager CE of the calculation period whether the calculating period ended based on the shared log.

6. The method according to claim 4 wherein each calculation iteration comprises updating the shared log with an identifier of the current updating CE.

7. The method according to claim 3 comprising monitoring, by the manager CE a progress of the one or more repetitions associated with the manager CE.

8. The method according to claim 1 comprising selecting the updating CE by a previously selected updating CE.

9. The method according to claim 1 wherein the group of CEs are all the CEs of the storage system.

10. The method according to claim 1 wherein the group of CEs are only some of all the CEs of the storage system.

11. A non-transitory computer readable medium for monitoring a storage system, the non-transitory computer readable medium stores instructions for:
   (a) generating a compute entity (CE) storage metric by each CE of a group of CEs to provide multiple CE storage metrics, wherein the multiple CE storage metrics are related to a monitoring period;
   (b) calculating, during a calculation period, a group storage metric based on the multiple CE storage metrices; wherein the calculating comprises performing multiple calculations iterations, wherein each calculation iteration comprises (i) selecting an updating CE that belongs to the group of CEs and was not previously selected during the calculation period, (ii) accessing, by the updating CE, a shared data structure that stores the group storage metric, and (iii) updating the group storage metric using the CE storage metric of the updating CE; and
   (c) repeating steps (a) and (b) for different CE storage metrics and for different group storage metrics; wherein repetitions related to a given group storage metric are executed at a repetition rate that differs from a repetition rate of repetitions related to another group storage metric.

12. The non-transitory computer readable medium according to claim 11 that stores instructions for performing multiple repetitions of steps (a) and (b) for obtaining the group storage metric, wherein step (b) of a certain repetition for obtaining the group storage metric is executed in parallel to an execution of step (a) of a next repetition.

13. The non-transitory computer readable medium according to claim 11 that stores instructions for performing multiple repetitions of step (b) for obtaining the group storage metric, and selecting a manager CE that belongs to the group of CEs for each one or more repetitions of the multiple repetitions; wherein the non-transitory computer readable medium comprises controlling, by the manager CE, an execution of the one or more repetitions associated with the manager CE.

14. The non-transitory computer readable medium according to claim 13 wherein each calculation iteration comprises updating a shared log indicative of CEs that already updated the group storage metric during the calculation period.

15. The non-transitory computer readable medium according to claim 14 that stores instructions for determining, by the manager CE of the calculation period whether the calculating period ended based on the shared log.

16. The non-transitory computer readable medium according to claim 14 wherein each calculation iteration comprises updating the shared log with an identifier of the current updating CE.

17. The non-transitory computer readable medium according to claim 13 that stores instructions for monitoring, by the manager CE a progress of the one or more repetitions associated with the manager CE.

18. The non-transitory computer readable medium according to claim 11 that stores instructions for selecting the updating CE by a previously selected updating CE.

19. The non-transitory computer readable medium according to claim 11 wherein the group of CEs are all the CEs of the storage system.

20. The non-transitory computer readable medium according to claim 11 wherein the group of CEs are only some of all the CEs of the storage system.

21. A storage system that comprises a group of compute entities, wherein each compute entity (CE) of the group of compute entities, is configured to generate a compute entity (CE) storage metric by each CE of a group of CEs to provide multiple CE storage metrics, wherein the multiple CE storage metrics are related to a monitoring period;

wherein the group of CEs are configured to calculate, during a calculation period, a group storage metric based on the multiple CE storage metrices;

wherein the calculating comprises performing multiple calculations iterations, wherein each calculation iteration comprises (i) selecting an updating CE that belongs to the group of CEs and was not previously selected during the calculation period, (ii) accessing, by the updating CE, a shared data structure that stores the group storage metric, and (iii) updating the group storage metric using the CE storage metric of the updating CE; and wherein each CE is configured to repeat generating different CE storage metrics, and wherein the group of CEs is configured to repeat calculating different group storage metrics;

wherein repetitions related to a given group storage metric are executed at a repetition rate that differs from a repetition rate of repetitions related to another group storage metric.

* * * * *